United States Patent
Sakemi et al.

[11] Patent Number: 5,943,088
[45] Date of Patent: Aug. 24, 1999

[54] IMAGE FORMING APPARATUS CAPABLE OF CONTROLLING DURATION OF LIGHT EMISSION FOR EACH PICTURE ELEMENT

[75] Inventors: Yuji Sakemi, Inagi; Hisashi Fukushima, Kawasaki, both of Japan

[73] Assignee: Canon Kabushiki Kaisha, Tokyo, Japan

[21] Appl. No.: 08/411,279

[22] Filed: Mar. 27, 1995

[30] Foreign Application Priority Data

Mar. 26, 1994 [JP] Japan .................................. 6-079767

[51] Int. Cl.⁶ ........................................... H04N 1/52
[52] U.S. Cl. ........................ 347/252; 347/251; 347/144; 358/298
[58] Field of Search ................................... 347/115, 232, 347/118, 139, 140, 252, 240, 144; 358/298

[56] References Cited

U.S. PATENT DOCUMENTS

| | | | |
|---|---|---|---|
| 5,177,536 | 1/1993 | Watanabe et al. | 355/251 |
| 5,267,007 | 11/1993 | Watanabe et al. | 355/245 |
| 5,287,148 | 2/1994 | Sakemi et al. | 355/245 |
| 5,294,959 | 3/1994 | Nagao et al. | 355/208 |
| 5,294,967 | 3/1994 | Munakata et al. | 355/326 R |
| 5,296,897 | 3/1994 | Amemiya et al. | 355/208 |
| 5,327,209 | 7/1994 | Sasanuma et al. | 355/327 |
| 5,327,339 | 7/1994 | Takeda et al. | 346/160 |
| 5,416,506 | 5/1995 | Arai et al. | 347/135 |
| 5,479,175 | 12/1995 | Cianciosi et al. | 347/252 |

*Primary Examiner*—N. Le
*Assistant Examiner*—Hai C. Pham
*Attorney, Agent, or Firm*—Fitzpatrick, Cella, Harper & Scinto

[57] ABSTRACT

An image forming apparatus includes a photosensitive member; an exposing device for emitting a beam of light in accordance with image data for forming an electric image on the photosensitive member; a plurality of developing devices for developing the electric image formed on the photosensitive member; a controller for controlling, for each picture element, duration of the beam of light emitted from the exposing device in response to an image signal; wherein the controller varies, for each picture element, a maximum value of the duration of the beam of light emitted from the exposing device, depending on which developing device is used.

10 Claims, 6 Drawing Sheets

IMAGE FORMING APPARATUS CAPABLE OF CONTROLLING DURATION OF LIGHT EMISSION FOR EACH PICTURE ELEMENT

BACKGROUND OF THE INVENTION

Field of the Invention and Related Art

The present invention relates to an electrophotographic image forming apparatus such as a copying machine or printer.

FIG. 6 illustrates an example of the general structure of an electro-photographic color image forming apparatus.

This color image forming apparatus comprises: a photosensitive drum 1 as an image bearing member, which is rotatively supported and is rotatable in the direction indicated by the arrow; a photosensitive drum 1 which is surrounded with a charger which uniformly charges the surface of the photosensitive drum 1 (in this case, a corona type charger); an image exposing means 3 that forms an electrostatic latent image correspondent to image data on the photosensitive drum 1; a developing apparatus 4 which develops the electrostatic latent image formed on the photosensitive drum 1 into a visible image; a transferring apparatus comprising a transfer drum 5a as a recording medium carrying member; a cleaner 6 which removes the developer remaining on the photosensitive drum 1, and like members.

The image exposing means 3 in this example is a laser beam based exposing apparatus comprising a polygon mirror, a lens system, and the like. The reflected light coming out of an unillustrated section for scanning an original is separated with a color separation filter or the like into primary color images. The thus obtained primary color images are converted to color image signals. A laser beam, which is modulated by each of the color image signals in a laser beam emitting section and is emitted therefrom, is projected onto the peripheral surface of the photosensitive drum 1 (for example, 82 mm in diameter) to expose the surface with an optical image E, or its equivalent, forming thereby an electrostatic latent image corresponding to each of the color image signals.

Also, in this example, a rotary developing apparatus is employed as the developing apparatus, in which four developing devices, for example, a developing device 4K for black color, a developing device 4C for cyan color, a developing device 4M for magenta color, and a developing device 4Y for yellow color, are mounted on a rotary member 4a, which rotates about a central axis 4b. Placement is such that a desired developing device is rotatively moved to a developing station, where it directly faces the photosensitive drum 1 to develop the latent image on the photosensitive drum 1.

Here, an overall operational sequence of this color image forming apparatus will be briefly described with reference to a full-color mode. First, the photosensitive drum 1 is uniformly charged by the charger 2. Then, the photosensitive drum 1 is exposed to a laser beam modulated by the image signal corresponding to the cyan color component of the original, whereby an electrostatic latent image is formed on the photosensitive drum 1. This latent image is developed by a cyan developing device 4C, which is moved in advance into the developing station. As a result, a visible cyan image (toner image) is formed on the photosensitive drum 1 by the resin based toner.

Meanwhile, recording medium such as transfer sheet is fed with a predetermined timing from a recording medium cassette 7a, 7b or 7c, or a manual feeding section. The sheet is then conveyed through a sheet delivery path indicated by a dotted line in the drawing, by a sheet delivery system comprising a pickup roller, a sheet feeding guide, a sheet feeding roller, and the like, to the transferring apparatus 5, in which it is wrapped around a transfer drum 5a.

This transferring apparatus 5 in this example comprises: a transfer drum 5a (for example, 164 mm in diameter) as a recording medium carrying member; a corona type charger 5b which discharges the corona for transferring the toner image from the photosensitive drum 1 onto the recording medium; a corona type charger 5c as means for attracting and adhering electrostatically the recording medium to the transfer drum 5a; a roller (contact type) 5g as an opposing electrode of the sheet attracting corona type charger 5c; an internal charger 5d of the corona type; and an external charger 5e of the corona type. The transfer drum 5a is supported so as to be rotatively driven and its cylindrical periphery is covered with a sheet 5f of dielectric film, which serves as means for carrying the recording medium.

The transfer drum 5a is rotated in the direction of the arrow in the drawing in synchronism with the photosensitive drum 1, and the latent image corresponding to the cyan color is developed into a cyan toner image by the cyan image developing device 4C. As the transfer drum 5a is further rotated, the visible cyan toner image is moved to the transfer section, where it is transferred onto the recording medium carried on the recording medium carrying sheet 5f by the corona type transfer charger 5b.

Thereafter, the transfer drum 5b continues its rotation, being on standby for the transfer of the next color image (for example, a magenta toner image).

As for the photosensitive drum 1 from which the toner image has been transferred, it is cleared of deposits such as the residual toner by a cleaner 6. Photosensitive drum 1 is then uniformly charged again by the charger 2, and is subjected to an imaging exposure by the laser beam modulated by the image signal corresponding to the next color, magenta, in the same manner as described before. Meanwhile, the developing apparatus 4 is rotated such that the magenta color developing device 4M is positioned at a designated developing point and develops the latent magenta image into a magenta toner image.

Then, this magenta toner image is moved into the transfer section, where it is transferred by the transfer charger 5b onto the recording medium carried on the recording medium carrying sheet 5f, in such a manner as to be overlaid on the cyan toner image. The transfer drum 5a continues its rotation, being on standby for the transfer of the next color toner image (i.e., yellow).

Next, the image forming and transferring processes described above are carried out for the yellow and black colors to finish overlaying the four color toner images. Thereafter, the recording medium is discharged by separating charger 5h, and then, is separated from the transfer drum 5a by a separating means 8 such as a separating claw. The separated recording medium is conveyed through a sheet path indicated by a dotted line in the drawing, and delivered to a fixing device (in this example, a heat roller type fixing device), by appropriate conveying means. In the fixing device, the four color toner images are fixed all at once, and then, the recording medium with the fixed full-color image is discharged onto the external tray.

The process described above is a single cycle of full-color image formation for producing a sheet of desired full color print.

However, a conventional image forming apparatus employing the above described structure suffers from the following faults.

(a) It takes substantial time to position a pertinent developing device into the developing station, which translates into a longer time for completing the image formation. This is because the developing apparatus is a rotary developing apparatus, which has to be rotated to position properly the developing device.

For example, when a sheet of A3 size paper, or two sheets of A4 size or letter size (LTR), which are the typical recording medium, are adhered on the recording medium carrying sheet 5f of the transfer drum 5a in a well-known manner, the interval between the sheets is short; therefore, it often happens that by the time the pertinent developing device of the developing apparatus arrives at the developing station, the latent image to be developed, which is on the photosensitive drum 1, will have passed the developing station, that is, the pertinent developing device is late for the intended image development. As a result, the latent image cannot be developed until it arrives at the developing station the next time. In other words, the photosensitive drum 1 must undergo an extra rotation, which prolongs the time between the beginning of an image forming operation and the end thereof.

(b) When a developing apparatus comprising a developing device used with two component developer, which will be described later, is employed, the toner and carrier are liable to be separated and scattered. More specifically, in the rotary developing apparatus, the toner is liable to be scattered from the developing device having been moved to a downward position, relative to the gravity direction. This results in contamination of the interior of the image forming apparatus.

(c) The photosensitive drum is liable to be damaged by being repeatedly exposed to the transfer charge since the diameter of the photosensitive drum is small. More specifically, because of commercial and industrial reasons such as the cheaper cost and less harmful properties, a photosensitive drum containing organic photosensitive member (hereinafter, OPC drum) is used, which is normally charged with a negative polarity to form a latent image, as opposed to being subjected to a positive charge during the image transfer. When the drum is subjected to the transfer charge of the positive polarity without the interposition of the recording medium, its charge polarity is liable to be shifted to the positive side.

Generally speaking, once the OPC drum being used on the negative polarity side is charged to the positive polarity, it is difficult to reverse the charge characteristics back to the negative side, and even if is reversed, the charge obtained thereafter becomes unstable, which is liable to fail to produce stably preferable images.

Because of the reasons described above, an image forming apparatus comprising a photosensitive drum with a larger diameter and fixed developing devices has been proposed.

Referring to FIG. 2, an example a of conventional electrophotographic color image forming apparatus having such a structure as described in the foregoing will be described. In FIG. 2, the members, components, elements or the like, which are equivalent to those in the color image forming apparatus illustrated in FIG. 6, will be given the same reference numerals as the ones given in FIG. 6. FIG. 2 illustrates only the photosensitive drum 1 and transfer drum 5a, omitting the remaining structural which are the same as those in FIG. 6.

In this exemplary color image forming apparatus, the image bearing member is a photosensitive drum 1 with a diameter of 180 mm, being supported so as to be rotatively driven in the direction of the arrow in the drawing. There are also provided in this apparatus: a developing apparatus consisting of four developing devices 4Y, 4C, 4M and 4K, each of which contains a developer of different color for developing an electrostatic latent image formed on photosensitive drum 1 into a visible image; a transferring apparatus comprising a transfer drum 5a as the recording medium carrying member; and the like.

Next, the developing operations of the developing devices 4Y, 4C, 4M and 4K within the aforementioned structure will be described in detail. In this structure, the developing devices 4Y, 4C, 4M and 4K are arranged in this order around the photosensitive drum 1 as the image bearing member from the upstream side towards the downstream side relative to the moving direction of the photosensitive drum 1 (rotational direction). When an operation for developing sequentially each of the latent images formed on the photosensitive drum 1 is carried out, the developing devices are sequentially activated from the downstream side toward the upstream side.

In other words, the order in which the developing devices are activated is different from that in which they are arranged; the devices are activated in the order of the magenta, cyan, yellow and black colors. That is, the developing operation is initiated from the magenta developing device 4M and is sequentially moved upstream relative to the rotational direction. Then, the operation is moved from the yellow developing device 4Y to the black developing device 4K, or, from the most upstream side to the most downstream side. Therefore, it cannot be called "from the downstream side to upstream side," in a strict sense. However, this movement is nothing but a movement for switching from one device to the next device; therefore, practically speaking, it may be called "in order from the downstream side to -upstream side."

Further, during a continuous image forming operation, this operational order of the developing devices is maintained so that the developing devices are always activated from the downstream side toward upstream side relative to the rotational direction of the photosensitive drum.

With the aforementioned structural arrangement, the actual yellow toner portion of the two component yellow developer from the yellow developing device 4Y, which is the one on the most upstream side, is scattered and mixed in the cyan, magenta and black colors from developing devices 4C, 4M and 4K, which are on the downstream side. However, since the yellow color is weak in terms of visual sensitivity, none of the problems that might have been caused by color mixing is found in the finished image.

Further, the color mixing caused by the scattering of magenta or cyan toner from the magenta developing device 4M or the cyan developing device 4C, respectively, does not create any problem in the finished image since it also is weak in terms of the visual sensitivity.

Thus, with the employment of the structure described above, it is possible to form a preferable image without suffering from any problem that might arise due to color mixing during the image forming operation.

Further, even during a full-color developing cycle, in which a sheet of A3 size recording medium or two sheets of A4 size recording medium are placed on the drum and the developing devices are activated from the downstream side toward the upstream side, there is no need for the transfer drum idling, which is a shortcoming of the conventional apparatus illustrated in FIG. 6.

The points described in the foregoing will be described in further detail with reference to the apparatus illustrated in FIG. 2 and the A3 size sheet. As described above, when a sheet of A3 size recording medium P is delivered to the transfer drum 5a, an a mm wide (in the rotational direction of the drum) strip of the peripheral surface of the transfer drum 5a is not covered with the recording medium. This distance a is longer than any of the distances between the adjacent two developing devices: b1 mm (between the black developing device 4K and magenta developing device 4M); b2 mm (between the magenta developing device 4M and cyan developing device 4C); b3 mm (between the cyan developing device 4C and yellow developing device 4Y).

First, when each of the color toner images is transferred onto a sheet of A3 size recording medium, the developing operation starts from the magenta developing device 4M and moves upstream to the cyan developing device 4C and to yellow developing device 4Y. Then, it is moved from the yellow developing device 4Y, which is the most upstream device, to the black developing device 4K, which is the most downstream one, where a cycle of the full-color image development ends. During the sequence of forming these toner images, the developing devices have been switched while the transfer drum 5a correspondingly rotates (a−b2) mm, (a−b3) mm, or (a+b1+b2+b3) mm; therefore, there will be no problem.

Next, when the second sheet of the recording medium is consecutively fed during the continuous copying operation, there is an interval of only a mm between the trailing edge of the first sheet and the leading edge of the second sheet, as described before. However, in this apparatus, the developing operation starts from the magenta developing device 4M on the most downstream side and is sequentially moved upstream to the cyan developing device 4C, to yellow developing device 4Y, and finally, is switched back from the yellow developing device 4Y on the most upstream side to the black developing device 4K on the most downstream side, repeating thereafter the same sequence. Therefore, the moment when the developing operation is switched from the black developing device 4K to magenta developing device 4M, the trailing end of the black latent image on the photosensitive drum 1, that is, the trailing end of the last latent image for the first sheet, comes out of the black developing device 4K, the leading end of the first latent image, that is, the magenta latent image, for the second sheet is at a point (a−b1) mm upstream of the magenta developing device 4M. This distance of (a−b1) mm gives sufficient time for making the switch between the developing devices, eliminating the need for one extra rotation of the transfer drum 5a.

In other words, it is unnecessary to waste time for the transfer drum 5a idling for each color as it is in the case of the rotary developing system illustrated in FIG. 6. As a result, mechanical performance deterioration such as a reduction in copying speed does not occur.

In addition, it is unnecessary to involve two or more developing devices at the same time to carry out the developing operation. Therefore, only a single motor M is needed in order to carrying out the developing operation, wherein the motor M is required to drive only one developing device at a time through one of the clutches CY, CC, CM or CK for each developing device. In other words, it does not happen that while one developing device is developing the pertinent latent image, another one is driven, causing thereby a torque change. Therefore, the latent images can be preferably developed.

However, even the image forming apparatus employing the fixed developing system such as the one illustrated in FIG. 2 suffers from the following shortcomings.

In the case of the two component developer, the potential difference necessary for obtaining an appropriate density varies for each developer, and this necessary potential difference is determined by the charge characteristics and amount of the pigment content in each developer. When the charge characteristics are relied on to equalize the potential for obtaining the proper density, the developer material properties must be substantially changed, which is extremely difficult.

Further, in terms of extending developer replenishing intervals, it is preferable to reduce the amount of developer consumption within a limit in which image quality does not deteriorate. This can be accomplished by using pigment with better dispersiveness since the better the dispersiveness the smaller a potential difference required to produce the necessary density. This in turn reduces developer consumption. However, the potential difference which each pigment requires to obtain the necessary density varies, depending on the color. However, when the pigment content of a developer that requires a smaller potential difference is reduced to increase the necessary potential difference for this developer to match the necessary potential difference for another developer that requires a larger potential difference, the developer consumption increases, which is not desirable.

Presently, generally speaking, the potential difference which each developer requires for obtaining the necessary density varies depending on the color of the pigment. Therefore, it is extremely difficult to equalize the potential difference necessary for each pigment by relying on the properties of the developer material.

Therefore, when images are formed using the image forming apparatus comprising the fixed developing system illustrated in FIG. 2, in conjunction with developers, each of which requires a different potential difference to obtain the necessary density, the toner or carrier is liable to adhere to unwanted areas when the developing devices are moved to and away from the developing station.

This problem will be described in detail, referring to the cyan and yellow developers. The yellow developer used in this conventional developing device generally displays good dispersiveness. In other words, the magnitude of the potential difference, at which a Macbeth density of 1.5 can be obtained, is 200 V, but it requires a potential difference of 350 V to obtain the same density when the cyan developer is used.

Here, "potential difference" means the difference between the potentials of the photosensitive drum and the developing device, wherein the value of the DC voltage actually applied to the developing device also varies in response to the potential difference. Next, the relation between the potential of the image portion of the photosensitive drum 1 surface and the value of the DC voltage applied to the developing device will be described with reference to specific cases: one in which the potential difference of 200 V is necessary between the photosensitive drum 1 and a developing device in order to develop reversely a latent image formed by the laser beam exposure, and another in which a potential difference of 350 V is needed under the same conditions.

As for the potential difference in this structure, a potential difference of 150 V is applied between the developing device and the photosensitive drum to attract the toner toward the developing device, so that the fog, which is created as the toner adheres to the non-image portion of the photosensitive drum 1 surface, can be prevented.

The potential is controlled so that a precise potential difference can be maintained in response to the sensitivity of the photosensitive member.

As for the developer and photosensitive material of the photosensitive member, negatively chargeable developers and a negatively chargeable OPC are employed, respectively.

When the necessary potential difference for the yellow developer is 200 V, the potential of the image portion of the photosensitive member is −50 V, and that for the non-image portion is −400 V, wherein the value of the DC voltage applied to the developing device is −250 V.

When the necessary potential difference for the cyan developer is 350 V, the potential at the image portion on the photosensitive member is −90 V, and the potential at the non-image portion is −590 V, wherein the DC voltage applied to the developing device is −440 V.

As described above, the value of the DC voltage applied to the developing device varies depending on the necessary potential difference for the developer. When the cyan color developing operation and yellow color developing operation are carried out one after another in the apparatus illustrated in FIG. 2, the value of the latent image potential on the drum 1 is that of the non-image portion. However, it is changed from the value set for the cyan to the one for the yellow at the mid point while transfer drum 5a rotates a mm.

The point at which the yellow developing device begins its operation is in a range in which the photosensitive drum 1 rotates (a−3b) mm, but the developing device is moved into, or out of, the developing station before this point. Even after the completion of the actual developing operation, the developing operation conducted by the cyan developing device is continued up until immediately before the activation of the yellow developing device to assure the reliability of the cyan color developing operation. As soon as the yellow color development begins, the cyan developing device is quickly moved away from the drum.

The yellow developing device begins its developing operation while the photosensitive drum 1 rotates (a−3b) mm. However, before it begins its operation, it must be moved into its dedicated developing station where it can develop the photosensitive member surface, and be readied for the developing operation.

Therefore, the yellow developing device comes in contact with the drum 1 before the mid point of the distance of a mm, and the cyan developing devices remains in contact with the drum 1 even after the mid point. As a result, the cyan developing device comes in contact with the non-image portion of the latent yellow image, and the yellow developing device comes in contact with the non-image portion of the latent cyan image.

The voltage applied to the cyan developing device is −440 V, whereas the potential of the latent yellow image is −400; therefore, the cyan toner is liable to adhere to the drum. The voltage applied to the yellow developing device is −250 V, whereas the potential of the latent cyan image is −590 V; therefore, the carrier is liable to adhere to the drum.

It may seem that the problem described above can be solved by improving the timing with which the developing device is moved in or out. However, it is impossible to reliably move the developing device into or out of the developing station with proper timing for the developing operation, unless extremely precise control is executed. Besides, when the image forming speed is increased, it becomes absolutely impossible.

As may be evident from the descriptions given above, it is extremely difficult to stably output a preferable image without the extra drum rotations. In other words, so far it has not been possible to output the preferable full-color image in which all of the primary colors display their maximum densities of the same level.

SUMMARY OF THE INVENTION

The primary object of the present invention is to provide an image forming apparatus which does not create the fog or carrier adhesion when the developing device is separated.

Another object of the present invention is to provide an image forming apparatus which does not create the density difference among the developing devices.

According to an aspect of the present invention, there is provided an image forming apparatus comprising: a photosensitive member; exposing means for emitting a beam of light in accordance with image data for forming an electric image on the photosensitive member; a plurality of developing devices for developing the electric image formed on the photosensitive member; controlling means for controlling, for each picture element, the duration of the beam of light emitted from the exposing means in response to an image signal; wherein the controlling means varies, for each picture element, a maximum value of the duration of the beam of light emitted from the exposing means, depending on which developing device is used.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, the embodiments of the present invention will be described with reference to the drawings.

Figure 1:
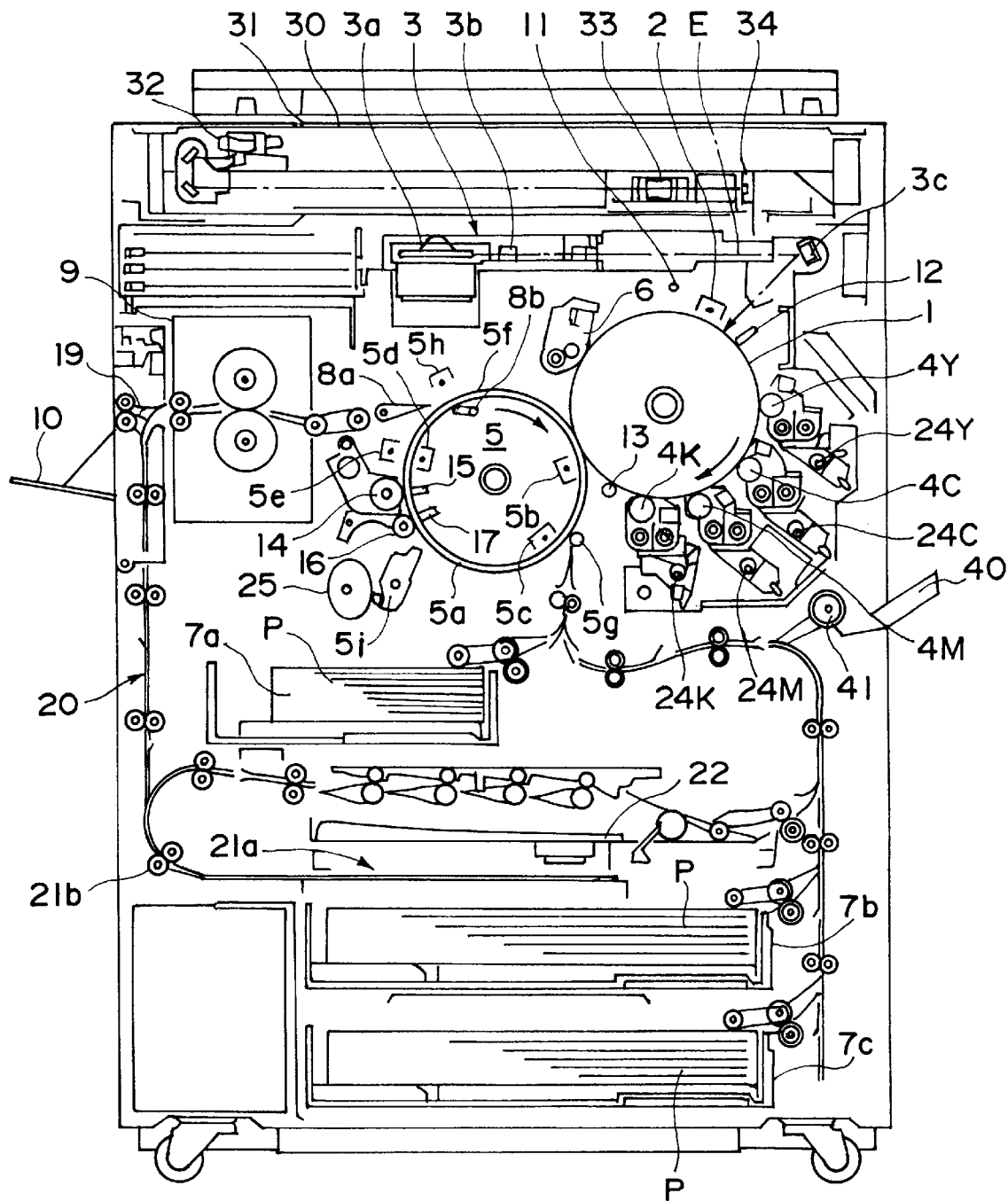
FIG. 1 is a sectional view of an embodiment of the image forming apparatus according to the present invention.

FIG. 1 is a sectional view of the embodiment of an image forming apparatus according to the present invention. The image forming apparatus in this embodiment is an electrophotographic full-color copying machine. This apparatus has a digital color image reader section in the top portion, and a digital color printer section in the bottom portion.

In the reader section, a sheet of original 30 is placed on the glass platen of an original reader 31, and is scanned by the beam of light from the exposing lamp 32. The beam of light reflected by the original 30 is focused by a lens 33 onto a full-color sensor 34, whereby image signals correspondent to the separated colors are obtained.

After being amplified by an unillustrated amplifying circuit, these image signals are processed by an unillustrated video processing unit, and then, are sent to the printing section.

In the printing section, the photosensitive drum 1 as the image bearing member is of a type with a large diameter of 180 mm, and is supported so as to be rotatively driven in the arrow mark direction.

Surrounding this photosensitive drum 1 are: pre-exposure lamp 11 for initializing the peripheral surface of the photosensitive drum 1; a charger 2 (corona type charger in this embodiment) for uniformly charging the surface of the photosensitive drum 1; exposing means 3 for forming an electrostatic latent image on the photosensitive drum 1 in response to the image data; a potential sensor 12 for detecting the potential of the photosensitive drum 1 surface; a fixed developing apparatus comprising four developing devices 4Y, 4C, 4M and 4K, each of which contains developer (toner) of a different color to be used to develop the electrostatic latent image formed on the photosensitive drum 1 into a visible image; optical detecting means for detecting the amount of toner on the photosensitive drum 1; a transferring apparatus 5 comprising a transfer drum 5a as the recording medium carrying member; a cleaner 6 for removing the residual developer on the photosensitive drum 1; and the like.

The exposing means in this embodiment comprises a polygon mirror 3a, a lens 3b, a mirror 3c and the like. A laser beam, E from a laser beam emitting section, which has been modulated by one of the color image signals obtained through the separation of the reflected beam of light from the reader section, is reflected by the polygon mirror 3a, and is projected on the surface of the photosensitive drum 1 by way of the lens 3b and mirror 3c, whereby an electrostatic latent image corresponding to the color image signals is formed for each of the primary colors.

During image formation in the printing section, the photosensitive drum 1 is rotated in the arrow mark direction. First, the peripheral surface of the photosensitive drum 1 is initialized by being discharged with the pre-exposure lamp 11. Next, it is uniformly charged by the charger 2. Then, the drum is exposed by the exposing means 3 to the optical image E correspondent to one of the separated primary colors, whereby the latent image corresponding to the optical image E is formed thereon. This process is sequentially repeated for all the separated primary colors in a predetermined order, whereby the corresponding latent images are sequentially formed on the peripheral surface of the photosensitive drum in the predetermined order.

Next, the magenta (M), cyan (C), yellow (Y) and black (B) developing devices are sequentially activated in this order (predetermined order) to develop sequentially the corresponding latent images on the photosensitive drum 1, whereby visible images of resin based toner are sequentially formed on the photosensitive drum 1. Then, one of the developing devices 4M, 4C, 4Y and 4B of the developing apparatus corresponding to the pertinent color for the latent color image having formed on the photosensitive drum 1 is moved closer to the photosensitive drum 1 to carry out the developing operation.

Meanwhile, a sheet of recording medium P such as a sheet of transfer paper is fed with a predetermined timing from a recording medium cassette 7a, 7b or 7c to the transferring apparatus 5, by a conveying system comprising: a pickup roller, sheet feeding guide, sheet feeding roller, and the like, where the sheet is wrapped around the transfer drum 5a.

This transferring apparatus 5 comprises: a transfer drum 5a as the recording medium carrying member having a diameter of 180 mm; a transfer charger 5b of the corona type for transferring the toner image formed on the photosensitive drum 1 onto the recording medium; a charging means for attracting and adhering the recording medium onto the transfer drum 5a; a recording medium attracting roller 5g as the opposing electrode for the recording medium attracting-adhering charging means; an internal charger 5d of the corona type; and an external charger 5e be of the corona type. The transfer drum 5a comprises a cylindrical frame supported by bearings where the periphery of the cylindrical frame is covered with a recording medium carrying sheet 5f as recording medium carrying means. The material for the recording medium carrying sheet 5f is composed of a sheet of dielectric material such as polycarbonate film.

The transfer drum 5a is rotated in the arrow mark direction in a synchronized manner with the photosensitive drum 1. The toner image developed by the magenta developing device 4M is moved into the transferring section, where it is transferred, by the transfer charger 5b, onto the recording medium carried on the recording medium carrying sheet 5f. The rotation of the transfer drum 5a continues, with the transfer drum 5a being readied and on standby for the transfer of the next color toner image (for example, cyan toner image).

Meanwhile, the photosensitive drum 1 from which the toner image has been transferred is cleaned, by the cleaner 6 of deposits such as residual toner. Then, the drum is uniformly charged again by the charger 2, and is exposed to the optical image formed thereon by the laser beam having been modulated by the next color image signal, that is, the cyan image signal.

This latent cyan image is developed by the cyan developing device 4c into a cyan toner image. The cyan toner image is rotated into the transferring section, where it is transferred by the transfer charger 5b onto the recording medium carried on the recording medium carrying sheet 5f. In other words, the cyan toner image is transferred in such a manner as to be overlaid on the magenta toner image. The transfer drum 5a continues its rotation, being on standby for transferring the next color toner image (for example, yellow toner image).

Next, the above described image forming process and image transferring process are carried out for the rest of the primary colors, yellow and black. After four color toner images are overlaid on the recording medium, the recording medium is discharged by the separation charger 5h. The recording medium is separated from the transfer drum 5a by the functions of a separating lifting roller 8b and a separating claw 8a and then conveyed to a fixing device 9 (heat roller in this embodiment), where all the color toner images are fixed at once to the recording medium. The recording medium is then discharged onto an external tray 10.

Thus, a single cycle of the color printing sequence has been completed to produce a sheet of the desired full-color print image.

When the image is formed on both surfaces of the recording medium, a sheet delivery path switching guide 19 is activated immediately after the recording medium is discharged from the fixing device 9. Therefore the recording medium is delivered through a vertical sheet delivery path 20 and is temporarily led into a reversal path 21a. Next, roller 21b is reversely rotated, whereby the recording medium temporarily sent in is sent out in the reverse direction, the leading edge this time being the previous trailing edge, and is stored in an intermediary tray 22. Thereafter, the same recording medium is fed from the intermediary tray 22 to the transferring apparatus 5, and an image is formed on the second surface of the recording medium through the aforementioned image forming process.

The image forming apparatus of this embodiment further comprises: a fur brush 14; a backup brush 15 which opposes the fur brush 14 with the interposition of the recording medium carrying sheet 5f; an oil removing roller 16; a backup brush which opposes the oil removing roller 16 with the interposition of the recording medium carrying sheet 5f. The transfer drum 5b is cleaned by these members so that unwanted particles are prevented from scattering over the recording medium carrying member 5f of the transfer drum 5a or adhering thereto. Also this prevents the oil from the recording medium from adhering thereto. Such a cleaning operation is carried out before or after image formation, and after a jam (paper jam) occurs.

In this embodiment, the gap between the recording medium carrying sheet 5f and photosensitive drum 1 can be optionally set. This is accomplished with a combination of an eccentric cam 25 driven with a predetermined timing and a follower 5i integrated with the transfer drum 5a. For example, when the image forming apparatus is on standby, or the power is not on, the gap between the transfer drum 5a and photosensitive drum 1 is widened.

Further, a double sided copy may be produced in the following manner. After an image is formed and fixed on one (first surface) of the surfaces of the recording medium, the recording medium is temporarily discharged into the tray 10. Then, this recording medium is placed in a manual sheet feeding section 40 with the second surface facing upward, and is re-fed into the image forming apparatus by a feeding roller 41. Thus an image is formed on the second surface. When a black-white copy is made, only the black developing device 4Bk is activated. Further, the image forming apparatus in this embodiment is capable of selectively executing many other modes beside the aforementioned ones. For example, there is a double sided black-white mode, a double sided mode in which one side is in color and the other side is in black-white, and others.

Next, the developing device and the developer contained in the developing device will be described in detail.

Each of the developing devices 4M, 4C, 4Y and 4K comprise a developing sleeve and a magnet of well known specifications enclosed within the developing sleeve. As the developing sleeve rotated the developer, which will be described later, is carried to the developing nip section, where the developing sleeve comes in contact with the photosensitive drum 1. In the developing nip section, a developing bias, which is specifically set for each color toner, is applied to the developing device by an unillustrated developing bias applying means, whereby only the toner jumps to the latent color image having been formed on the photosensitive drum 1, developing thereby the latent color image into a visible color toner image.

The developer is constantly stirred by an internal screw, and its toner density is measured with an unillustrated developer density measuring apparatus. When necessary, a specific amount of toner is replenished from an unillustrated toner replenishing apparatus, so that the developing sleeve can be constantly supplied with developer of a specific toner density.

Each developer is composed of two components, a magnetic carrier and one of the color toners: magenta, yellow, cyan on black toners.

As for the ratio of toner Tg and carrier Cg, that is, $$\{T/(T+C)\} \times 100:$$

it is 4.5% for the yellow developer, and 6.0% for the magenta, cyan or black developer.

As for the carrier, ferrite particles of the Cu—Zn—Fe group is used, wherein the particle surface is coated with silicon resin.

The toner composition is:

| | |
|---|---|
| Polyester resin obtained by condensing propoxylbisphenol and fumaric acid | 100 parts |
| Chromic complex of 2-tert-butyl salycilate | 2 parts |
| Color pigment | 4 parts |

The above listed compounds are sufficiently pre-mixed by a Henschell mixer, and then, is melted and kneaded with a double axle extruder. After the mixture is cooled, it is crushed into coarse particles with a particle size of approximately 1 mm to 2 mm. Then, the particles are pulverized into micro-particles using a pulverizer of the air jet type. The micro-particles thus obtained are classified, and those having a particle size of 2 $\mu$m to 10 $\mu$m are selected as the coloring agent containing resin particles for this embodiment.

Further, as for the additive, 1.0 part of titanium oxide with a particle diameter of 0.05 $\mu$m, and 0.5 part of strontium titanate are added to 100 parts of the coloring agent containing resin particles obtained in the aforementioned manner.

As for the color pigments in this embodiment, the following are used:

Yellow: azi pigment
Magenta: quinacridon pigment
Cyan: phthalocyanine pigment
Black: carbon black Next, the developing operation of the developing device having the above described structure will be described in detail. According to the structure described above, multiple developing devices are arranged around the image bearing member (photosensitive drum) in a predetermined order in the direction of upstream to downstream relative to the moving direction of the image bearing member. When the latent images formed sequentially on the image bearing member are sequentially developed through the sequential activation of these developing devices, the order of the developing device activation is from the downstream side to upstream side relative to the moving direction of the image bearing member.

More specifically, according to this structure, four developing devices 4Y, 4C, 4M, and 4K are arranged around the photosensitive drum 1 in the order of yellow, cyan, magenta, and black colors from the upstream side toward downstream side relative to the rotational direction of the photosensitive drum 1, as shown in FIG. 1.

However, the order of the developing device activation is different from the order in which the colors are listed in the foregoing paragraph. The developing devices are activated in the order of magenta, cyan, yellow, and black. In other words, the developing operation starts from the magenta developing device 4M and is sequentially moved upstream relative to the rotational direction of the photosensitive drum 1. Strictly speaking, the expression of "downstream side to upstream side" may not be correct since the operational shift from the yellow developing device 4Y to black developing device 4K is made from the most upstream side to the most downstream side. However, since this shift is made at a switching point of the developing device, the expression of "downstream side to upstream side" may be accepted in practical terms.

Further, even when the developing devices are repeatedly activated during a continuous image forming operation, the order of the developing device activation is maintained in the above described order, from the downstream side toward the upstream side relative to the rotational direction of the photosensitive drum.

Figure 2:
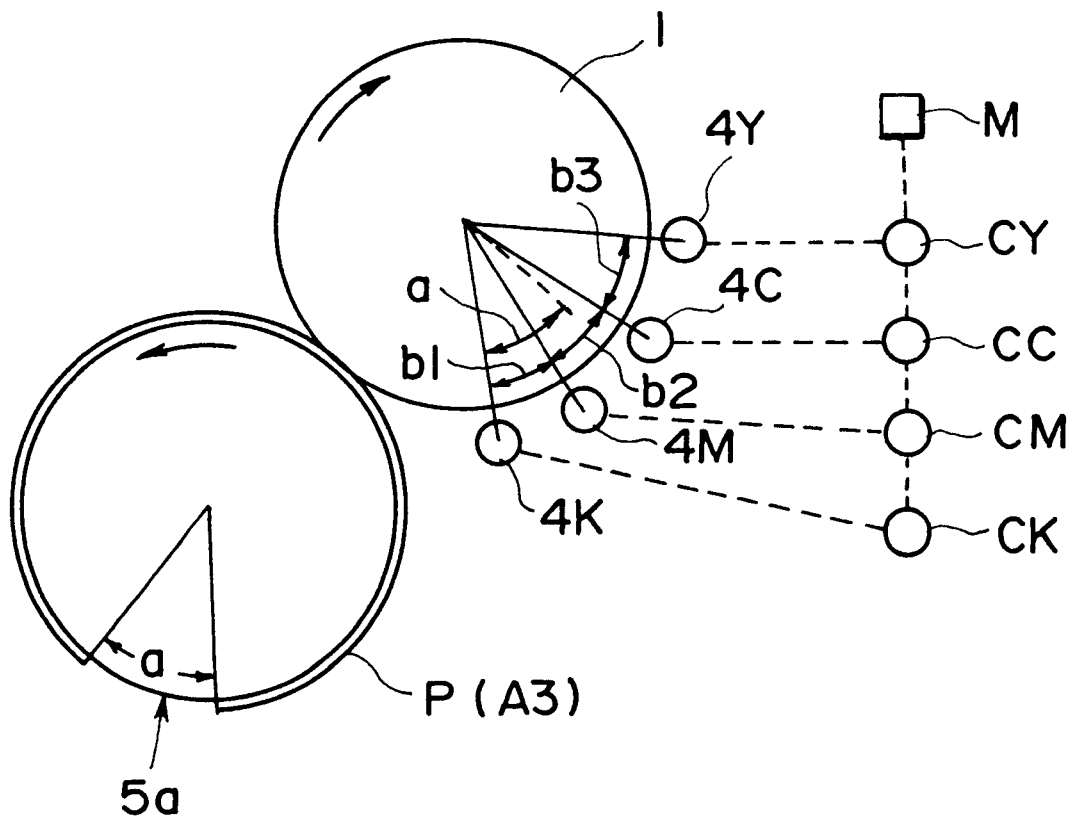
FIG. 2 is an explanatory schematic drawing, which describes the order in which the developing devices are arranged, the developing operation, and the transferring operation.

Further, this structure is similar to that of the apparatus illustrated in FIG. 2. In other words, it comprises a photosensitive drum 1 with a large diameter, and two or more (four) fixed developing devices 4Y, 4C, 4M, and 4K, which are arranged around the photosensitive drum 1 in a predetermined order (listed order in this case) from the upstream side to downstream side relative to the rotational direction of the photosensitive drum 1. When the latent images are formed sequentially on the photosensitive drum 1, they are developed through the sequential activation of the developing devices. The developing devices are activated in the order of the downstream side to upstream side relative to the moving direction of the photosensitive drum 1.

Figure 6:
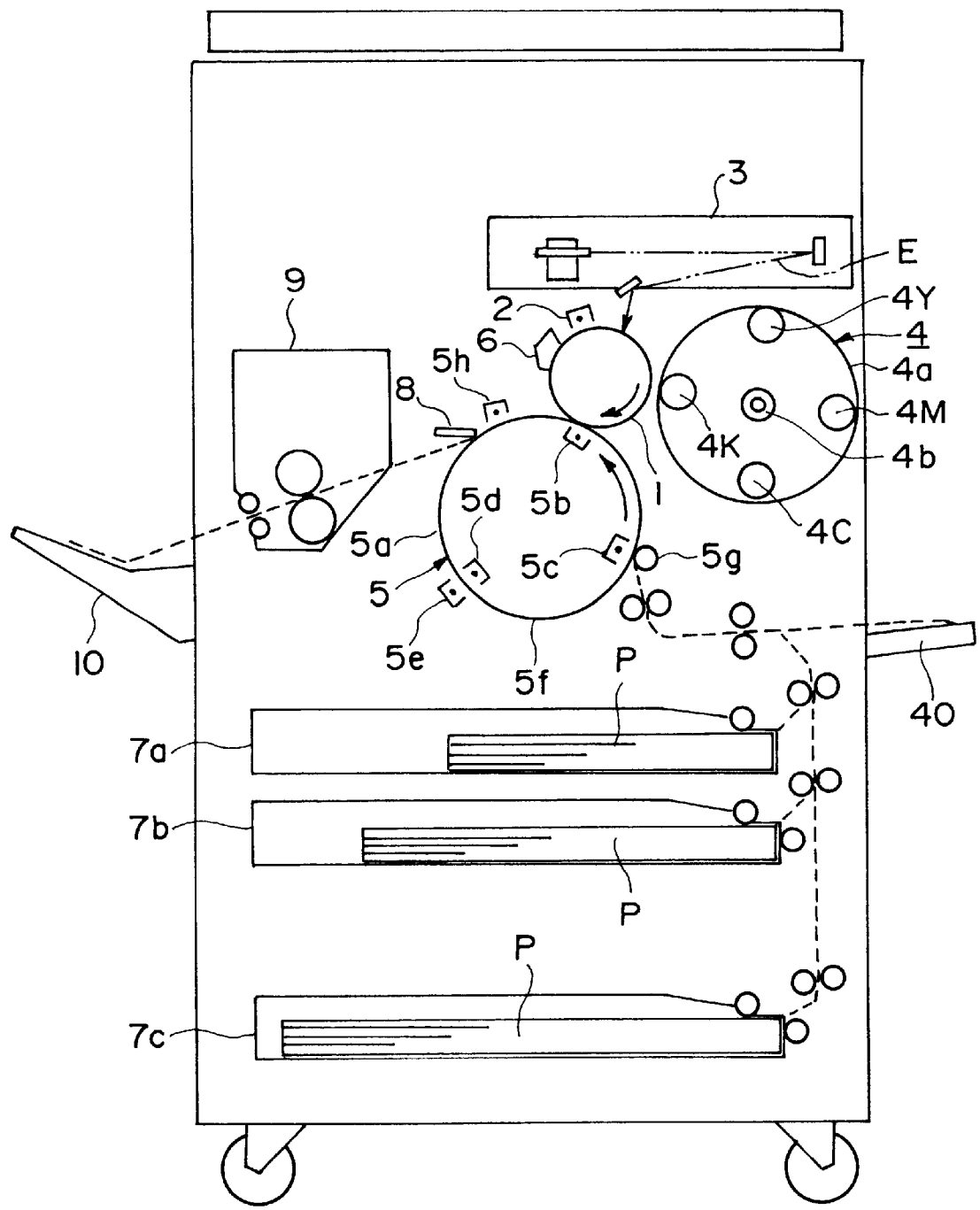
FIG. 6 is a schematic sectional view of a full-color copying machine.

Therefore, the apparatus of this embodiment is capable of producing, just like the apparatus illustrated FIG. 2, a preferable image which does not suffer from imperfections such as color mixing. Further, the same developing device activating order, that is, from the downstream side to the upstream side, is also applied during the continuous image forming operation. Therefore, even when a sheet of A3 size recording medium or two sheets of A4 size recording medium are adhered on the transfer drum during the continuous image forming operation, there is no need for wasting time when the transfer drum is idling, the need for which is a shortcoming of the apparatus illustrated in FIG. 6. In other words, according to this structure, the deterioration of mechanical performance such as a decrease copying speed does not occur during the full-color image formation.

Further, according to this structure, two or more developing devices do not operate at the same time. Therefore, only a single motor M is needed, because only one developing device is driven at a time by the motor M through one of clutches CY, CC, CM, and CK. Therefore, the torque change, which occurs when the second developing device is activated while the first one is developing one of the latent images, does not occur.

Thus, the structure according to the present invention can carry out a preferable developing operation.

Next, means for controlling the duration of the laser beam emission, of the present invention, will be described.

In this embodiment, in order to eliminate the problems described before, the DC component of the bias voltage applied to the developing means is substantially equalized for continuously operated developing means 4Y, 4C, 4M, and 4K, wherein the maximum value of the duration of light beam emission per picture element is varied depending on the developing means which carries out the developing operation.

In other words, during the image forming operation in this embodiment, the composition of the cyan and yellow developers, and the developing conditions other than the potential difference are kept the same as those for the conventional apparatus, whereas the potential difference for the yellow is set at 350 V.

In the case of the conventional image forming method, which is not digital, increasing the potential difference this high gives the yellow color a Macbeth density of 2.0, resulting in a yellowish image.

In this embodiment, however, the tone gradation is adjusted by decreasing the duration of the beam emission even though the potential difference is set at 350 V. Therefore, despite the fact that the potential difference is set at the same level for both the yellow and cyan colors, an image displaying the same level of tone gradation for yellow and cyan can be produced. Below, the details of this procedure will be described.

Figure 3:
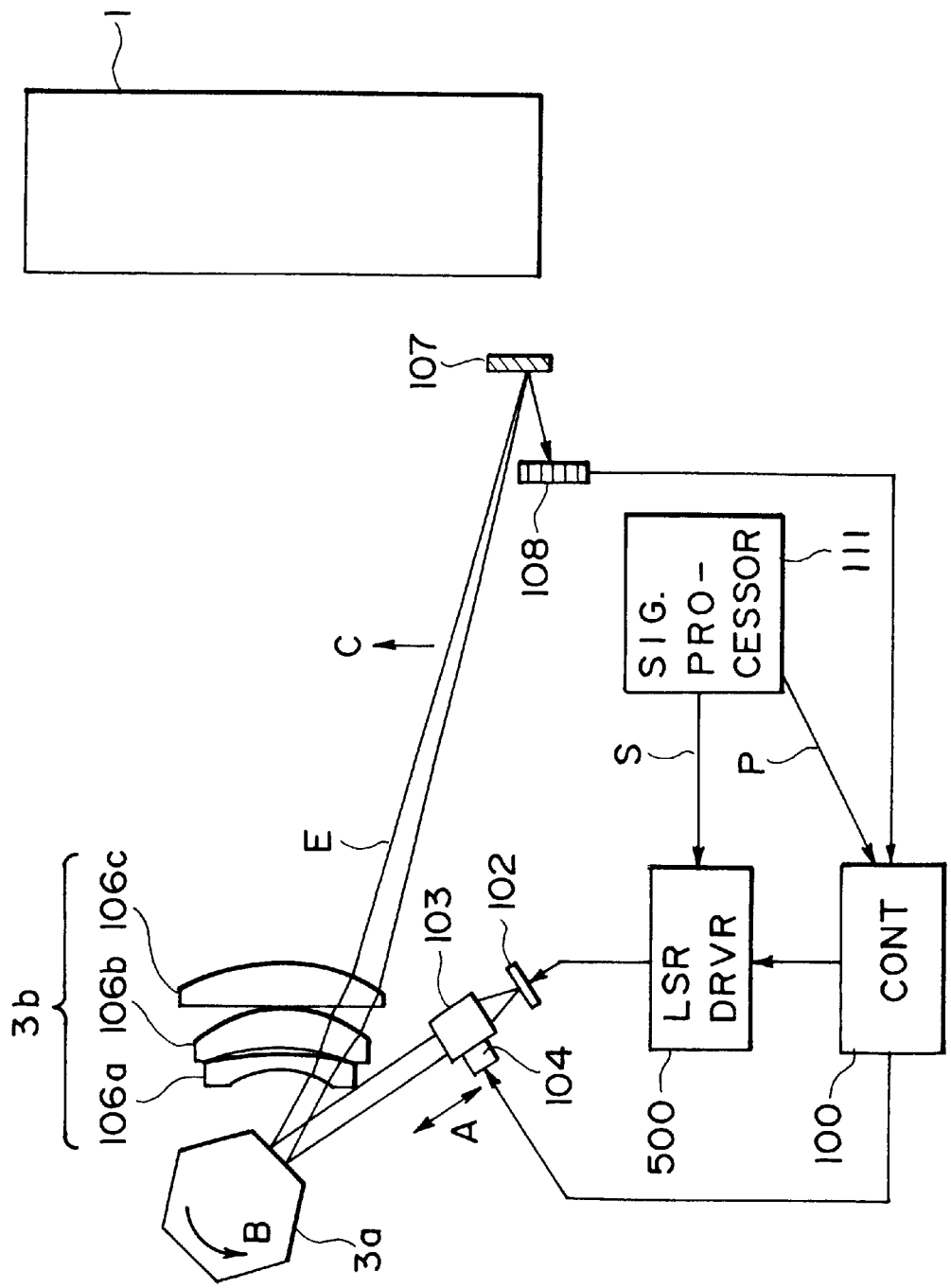
FIG. 3 is a structural drawing of an exposing means.

Referring to FIG. 3, the exposing means of this embodiment comprises a semiconductor laser section 102, a polygon mirror 3a which revolves at a high speed, and an F-θ lens group 3b. The semiconductor laser 102 emits a laser beam E, which has been modulated with sequential digital image signals, and exposes the surface of the photosensitive drum 1, wherein the sequential digital signals are obtained using an image reading apparatus, a computer, and the like.

The aforementioned developing devices 4Y, 4C, 4M, and 4K reversely develop the latent image. That is, the toner, which has been charged to the same polarity as the charge polarity of the charger 2, adheres to the latent image, on the portions having the potential corresponding to bright spots. Therefore, the laser beam E in this embodiment exposes the photosensitive drum 1 on the portions where the tone is to be adhered.

More specifically, referring to FIG. 3, the semiconductor laser element 102, which is the light source, is connected to a laser driver 500, which is an emission signal generation device for generating the emission signal (driving signal) to be sent out to emit the laser beam, wherein it is turned on or off in response to this emission signal from the laser driver.

The laser beam E emitted from the laser element 102 is passed through a collimator lens system 103, whereby it is turned into a beam composed of substantially parallel rays of light. This collimator lens system 103 is movable in the direction of an arrow mark A, that is, the direction of the optical axis of the laser beam, by a focal point adjusting means 104 comprising a rack on which the lens system 103 is fixed, a pinion engaging with this rack, a motor for driving this pinion, and the like.

The polygon mirror, which is a multifaceted rotary mirror 3a, rotates at a constant speed in the direction of the arrow mark B, whereby the beam of parallel rays, which come out of the collimator lens system 103, makes a scanning movement in the arrow direction.

The F-θ lens group 3b (106a, 106b and 106c) disposed in front of the multifaceted rotary mirror 3a focuses the laser beam deflected by the multifaceted rotary mirror 3a as a spot on the surface to be scanned, that is, the photosensitive drum 1 surface, while maintaining a constant scanning speed on the scanned surface.

Here, the direction in which beam E is caused to scan the photosensitive drum 1 surface by the multifaceted mirror 3a is the direction of arrow C, and is designated as the main scanning direction. The main scanning direction is a direction that intersects with the direction in which the photosensitive drum 1 moves in the exposing section. Preferably, this direction is substantially perpendicular to the moving direction of the photosensitive drum 1.

On the other hand, the direction in which the photosensitive drum 1 moves in the exposing section is designated as the secondary scanning direction. The surface of the photosensitive drum 1 is scanned in both main and secondary directions. In other words, it is raster scanned.

Before being modulated in response to the image signals obtained from the target image, the laser beam E is guided onto a CCD (solid state picture taking element) 108 as detecting means by way of a full reflection mirror 107. The CCD 108 comprises a large number of photoelectric transducer elements, which are arranged in the direction of arrow mark C in such a manner that is substantially equivalent to the surface of the photosensitive drum 1 in optical terms. Further, the CCD 108 is connected to the laser driver 500 and a control section 100 which controls the focal point adjusting means 104.

Further, a signal processing section (image processing section) 111 is connected to the laser driver 500 and control section 100.

When a desired image is formed with the above described structure in place, an image output signal P is sent from the signal processing section 111 to the control section 100, and at the same time, an image signal S is inputted in the laser driver 500 so that the laser element 102 is turned on or off in response to the image signal S.

Each time the surface of the photosensitive drum 1 is scanned in the primary scanning direction by the laser beam E emitted in the above described manner, an exposure distribution equivalent to a single line of scanning in the primary direction (main scan direction) is formed on the photosensitive drum 1. After each line of scanning in the primary scanning direction, the photosensitive drum 1 rotates by a predetermined distance, whereby a latent image displaying the exposure distribution corresponding to the image signal S is formed on the photosensitive drum 1.

As for the image output signal P. it is outputted from the signal processing section 111 before the image signal S. Its output is terminated after the output of the signal S is terminated. The control section 100 disables the focal point adjusting means while the image output signal P is inputted from the signal processing section 111.

Next, referring to FIG. 4, a PWM (pulse width modulation) circuit will be described. The PWM circuit comprises: a TTL latch circuit 401 which latches an eight bit image signal; a level convertor 402 which converts a TTL logic level to a high speed ECL logic level; an ECLD/A convertor; an ECL comparator 404 which generates the PWM signal; a level convertor 405 which converts the ECL logic level to the TTL logic level; a clock generator 406 which generates a clock signal $2f$ having a frequency twice that of an image clock signal f; a triangular wave generator 407 which generates a substantially idealistic triangular wave signal in synchronism with the clock signal $2f$; and a frequency divider which halves the clock signal $2f$. Also, the PWM circuit comprises ECL logic circuits disposed wherever necessary for the circuit to operate at a high speed.

The operation of the PWM circuit constructed as described above will be described with reference to FIG. 5, which illustrates various signal wave patterns. A signal (a) is the clock signal $2f$ and a signal (b) is the picture element clock signal f having a period twice that of the signal (a), wherein both signals are collated with the picture element number. In order to maintain a duty ratio of 50% for the triangular wave signal (c), the triangular wave generator 407 halves the frequency of the clock signal $2f$ before it generates the triangular wave signal (c). This triangular wave signal (c) is converted into the ECL level (0 V--1 V), whereby a triangular wave signal (d) is obtained.

First, in the case of the cyan color, the picture element signal displays 256 gradation levels, from a level of 00H (white) to a level of FFH (black), wherein "H" stands for hexadecimal notation. The image signal (e) represents ECL voltage obtained through the D/A conversion of the gradation level expressed in hexadecimal notation.

Figure 5:
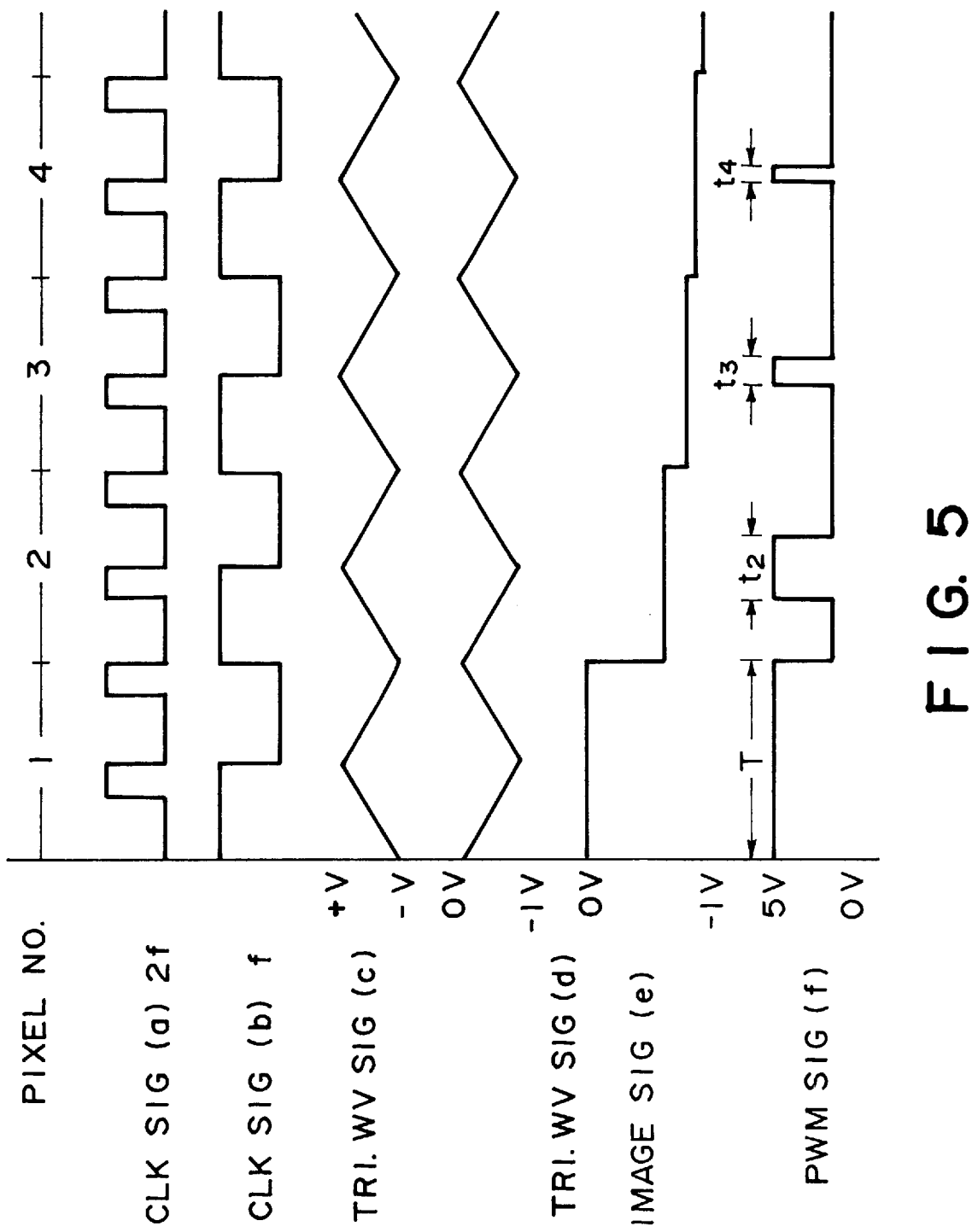
FIG. 5 illustrates waveforms of the PWM circuit.

Referring to FIG. 5, the first picture element is a black picture element of the highest density, and displays a voltage level equivalent to a gradation level of FFH. The second picture element displays a voltage level equivalent to an intermediate gradation level of 80H. The third picture element has a slightly lower density than the second element, and displays a voltage level equivalent to an intermediate level of 40H. The fourth picture element has a slightly lower density than the third picture element, and displays a voltage level equivalent an intermediate gradation level of 20H.

The comparator 404 compares the triangular wave signal (d) and image signal (e), and generates a PWM signal having a pulse width equivalent to the density of the picture element to be formed (in FIG. 5, pulse widths T, t2, t3 and t4, wherein T>t2>t3 t4).

The PWM signal is converted to the TTL level of 0 V or 5 V, that is, a PWM signal (f) (laser driving pulse signal with a given pulse width including zero width), is inputted to the laser driver circuit 500.

Thus, the semiconductor laser 102 emits the laser beam for each picture element, for a duration equivalent to the pulse width of the signal (f) while scanning thereby exposing the photosensitive drum 1. Since the printer in this embodiment employs the reversal development system, the higher the density of a picture element has to be, the longer the laser beam is emitted.

In the case of yellow color, the picture element signal is given 177 gradation levels, that is, a range of 00H (white) to B0H (black). In other words, the duration of the laser beam emission corresponding to the highest yellow density is shorter than that for the cyan color by a ratio of B0/FF. Therefore, the resultant density equals that of the cyan color.

Figure 4:
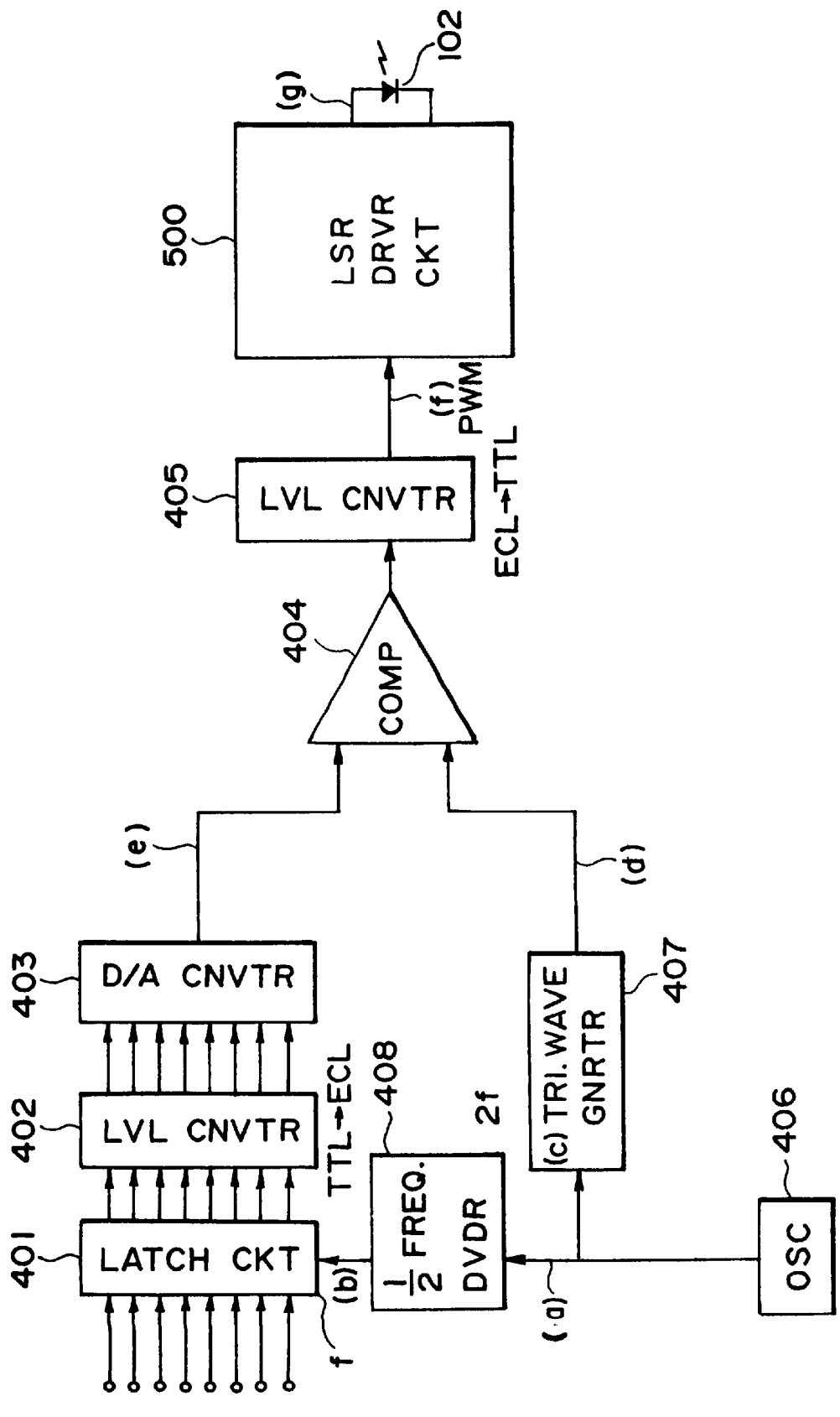
FIG. 4 is a circuit diagram of a PWM circuit.

Referring to the circuit in FIG. 4, an unillustrated look-up table is provided at a front end of the latch circuit. This look-up table is a memory that contains the data for γ-correction and is used to carry out the γ-correction (gradation correction) for each color. The table is accessed using the eight bit image signal as an address, whereby a γ-corrected image signal is outputted. Since the duration of the laser beam emission is controlled using the γ-correction as described above, the theoretical minimum emission level does not change whether the color is yellow or cyan. In other words, it is 1/255 of the full duration for one picture element. Therefore, the duration of the laser beam emission for yellow is varied between 0 and 176/255 by an interval of 1/255 the full duration, so that a proper level of gradation is obtained.

On the other hand, in the case of cyan color, the duration of the laser beam emission is varied between 0 and 255/255 by the interval of 1/255 in order to obtain a proper level of gradation.

Since the maximum density is set at 1.5 for both cyan and yellow, there is a theoretical difference in terms of the minimum interval of reproducible gradation. However, no difference is detectable in terms of the actual output. Therefore a full-color image with visually uniform color density can be obtained.

It should be noted here that it is unnecessary for the potential differences for cyan and yellow to be exactly the same. In other words, as long as they are substantially the same, no fog nor carrier adhesion occurs.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:
   a photosensitive member;
   exposing means for emitting a beam of light in accordance with image data for forming an electric image formed by a plurality of picture elements on said photosensitive member;

a plurality of developing devices for developing said electric image formed on said photosensitive member;

controlling means for controlling, for each picture element, duration of the beam of light emitted from said exposing means in response to an image signal;

wherein said controlling means varies, for each picture element, a maximum value of the duration of the beam of light emitted from said exposing means, depending on which developing device is used.

2. An image forming apparatus according to claim 1, wherein said plurality of developing devices contain developers of different colors, and the images, developed said plurality of developing devices, are sequentially transferred onto a common transfer material.

3. An image forming apparatus according to claim 2, wherein said plurality of developing devices are arranged around said photosensitive member in a moving direction of said photosensitive member, and they are sequentially operated for the developing operation starting from downstream side with respect to the moving direction of said photosensitive member.

4. An image forming apparatus according to claim 1, wherein an oscillating bias voltage is applied to said developing device during a developing operation, and centers of bias voltage oscillations for said developing devices are substantially the same.

5. An image forming apparatus according to claim 1, wherein a minimum value of the duration of the beam of light emitted per picture element from said exposing means is constant in all developing devices.

6. An image forming apparatus according to claim 1, wherein said developing devices include a device containing yellow toner, a device containing cyan toner, and a device containing magenta toner.

7. An image forming apparatus according to claim 1, wherein said plurality of developing devices contain toner and carrier particles.

8. An image forming apparatus according to claim 1, wherein the image signal is in a form of pulses, and said controlling means controls a pulse width of the pulses.

9. An image forming apparatus according to claim 2, wherein potential difference between said developing device and photosensitive member for obtaining a same degree of density, varies among developers of different color.

10. An image forming apparatus according to claim 1, wherein said exposing means comprises a laser as a light source for emitting a beam of light in response to the image signal.

* * * * *

UNITED STATES PATENT AND TRADEMARK OFFICE
CERTIFICATE OF CORRECTION

PATENT NO.: 5,943,088

DATED : August 24, 1999

INVENTOR(S) : Yuji SAKEMI, et al.

It is certified that error appears in the above-identified patent and that said Letters Patent is hereby corrected as shown below:

COLUMN 3:

Line 66, "structural" should read --structures--.

COLUMN 4:

Line 38, "upstream" should read --the upstream--.

COLUMN 10:

Line 6, "be" should be deleted.

UNITED STATES PATENT AND TRADEMARK OFFICE
CERTIFICATE OF CORRECTION

PATENT NO. : 5,943,088

DATED : August 24, 1999

INVENTOR(S) : Yuji SAKEMI, et al.

It is certified that error appears in the above-identified patent and that said Letters Patent is hereby corrected as shown below:

<u>COLUMN 11</u>:

Line 42, "rotated" should read --rotates--.
Line 43, "is" should read --it is--.

<u>COLUMN 12</u>:

Line 2, "is" (first occurrence) should read --are--.
Line 14, "is" should read --are--.
Line 30, "azi" should read --azo--.

<u>COLUMN 14</u>:

Line 20, "tone" should read --toner--.

<u>COLUMN 15</u>:

Line 55, "(OV— IV)," should read --(OV- - IV),--.

UNITED STATES PATENT AND TRADEMARK OFFICE
CERTIFICATE OF CORRECTION

PATENT NO. : 5,943,088

DATED : August 24, 1999

INVENTOR(S) : Yuji SAKEMI, et al.

It is certified that error appears in the above-identified patent and that said Letters Patent is hereby corrected as shown below:

COLUMN 17:

Line 12, "developed" should read --developed by--.

Signed and Sealed this

Fourteenth Day of November, 2000

Attest:

Q. TODD DICKINSON

*Attesting Officer*     *Director of Patents and Trademarks*